United States Patent
Ogawa

(10) Patent No.: US 8,189,069 B2
(45) Date of Patent: May 29, 2012

(54) IMAGE PROCESSING APPARATUS AND METHOD

(75) Inventor: Katsuhisa Ogawa, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 618 days.

(21) Appl. No.: 12/099,563

(22) Filed: Apr. 8, 2008

(65) Prior Publication Data

US 2008/0252750 A1    Oct. 16, 2008

(30) Foreign Application Priority Data

Apr. 13, 2007  (JP) ................................ 2007-106121

(51) Int. Cl.
*H04N 5/235* (2006.01)

(52) U.S. Cl. .................................................. 348/229.1

(58) Field of Classification Search ............... 348/218.1, 348/229.1, 234–237, 396.1, 668; 382/168, 382/172

See application file for complete search history.

(56) References Cited

U.S. PATENT DOCUMENTS

| | | | |
|---|---|---|---|
| 5,801,773 A | | 9/1998 | Ikeda |
| 5,828,793 A | * | 10/1998 | Mann ............................ 382/284 |
| 6,078,357 A | * | 6/2000 | Yamamoto et al. ........... 348/234 |
| 6,160,532 A | * | 12/2000 | Kaburagi et al. ............... 345/87 |
| 6,204,881 B1 | | 3/2001 | Ikeda et al. |
| 6,825,884 B1 | * | 11/2004 | Horiuchi ....................... 348/362 |
| 2006/0033823 A1 | * | 2/2006 | Okamura ...................... 348/254 |
| 2006/0061845 A1 | | 3/2006 | Lin ............................... 358/540 |
| 2006/0245014 A1 | * | 11/2006 | Haneda ......................... 358/512 |

FOREIGN PATENT DOCUMENTS

| | | |
|---|---|---|
| JP | 5-176233 | 7/1993 |
| JP | 07-131718 | 5/1995 |
| JP | 3420303 | 4/2003 |
| JP | 2006-87063 | 3/2006 |
| JP | 2006-148743 | 6/2006 |

\* cited by examiner

*Primary Examiner* — Luong T Nguyen
*Assistant Examiner* — Akshay Trehan
(74) *Attorney, Agent, or Firm* — Fitzpatrick, Cella, Harper & Scinto

(57) ABSTRACT

An image processing apparatus is provided that determines a correction gain factor at a high rate of speed to synthesize an image. The apparatus includes a long second middle luminance image detecting unit for detecting a pixel having a pixel value in a first middle luminance pixel value region derived from a long second exposure image, a short second middle luminance image detecting unit for detecting a pixel having a pixel value in a second middle luminance pixel value region derived from a shorter second exposure image; a correction gain factor calculating unit for designating, as a common pixel, the pixel detected by the long second middle luminance image detecting unit and the pixel detected by the short second middle luminance image detecting unit, each of the pixels at a common position, and for calculating a correction gain factor based on the pixel values of the common pixels.

13 Claims, 6 Drawing Sheets

IMAGE PROCESSING APPARATUS AND METHOD

BACKGROUND OF THE INVENTION

1. Field of the Invention

The present invention relates to an image processing apparatus and method.

2. Description of the Related Art

In recent years, a solid-state imaging device, such as a charge coupled device (CCD) sensor and a complementary metal oxide semiconductor (CMOS) sensor, has been used as an imaging device of an image inputting apparatus, such as a television camera, a video camera, and a digital camera. However, the dynamic range of the solid-state imaging device is narrower than that of a film of a film-based camera, and the image quality of the solid-state imaging device deteriorates in some imaging conditions.

Accordingly, as a method of expanding the dynamic range of the solid-state imaging device, there is a wide dynamic range image synthesizing technique using a multiple exposure system, in which a plurality of images of the same scene, which images have different exposure quantities different from one another, are photographed and the photographed plurality of images are synthesized to obtain an image having an expanded dynamic range. The flow of the image synthesizing processing will be described step by step below.

(1) In order that the image signals on the lower luminance side of a subject may take suitable values, a long second exposure image accumulated for a long exposure time is imaged. However, in the long second exposure image, the quantity of light on the higher luminance side of the subject is large, and the "saturation into white," in which an image signal is saturated, occurs.

(2) A short second exposure image, which has been accumulated for a short time during which the image signals on the higher luminance side of the subject take suitable values, is imaged. An image at all the imaged pixels of which image signals are not saturated to cause no "saturation into white" is obtained.

(3) The pixel signals from the long second exposure pixels at which the "saturation into white" occurs are abandoned, and the pixel output values of a short second exposure image at the coordinate positions of the abandoned image signals replace the abandoned image signals.

(4) A correction gain G is determined on the basis of a ratio of each of the pixel output values of the long second exposure image and the short second exposure image, and the replaced short second exposure image is multiplied by the determined correction gain G to correct the shifts between the luminance levels of both the images.

If the ratio of exposure times is made to be the correction gain G, then offsets remain in the boundary parts between the long second exposure pixel output values and the short second exposure pixel output values, and the offsets are visually observed as a fake edge. The cause of the occurrence of the fake edge is that the correction gain quantity necessary for the correction is not only determined by the ratio of the exposure times, but also is influenced by the nonlinearity of the outputs of the sensor, the non-linear gain errors of a reproducing analog circuit system, and the like, besides. Accordingly, the correction gain G is calculated on the basis of real image information, as described with regard to the aforesaid item (4).

A method of calculating the correction gain G from the long second and short second exposure pixel output values is disclosed in the following first patent document. The correction gain determining method of Japanese Publication of Patent No. 3420303 (the first patent document) first calculates the ratio of luminance values at each of the pixels of an imaged long second exposure image and an imaged short second exposure image. The calculated ratios are expressed as luminance level ratios. The method next calculates an average of the luminance level ratios of a pixel group having the same luminance value of the long second exposure image (hereinafter referred to as long second luminance value) on the basis of the long second luminance values, and the calculated average of the luminance level ratios is set as a luminance level ratio representative value at the long second luminance value. Then, the method produces a graph having an X-axis plotted by long second luminance values and a Y-axis plotted by the luminance level ratio representative values. Because the long second exposure pixels cause the saturation into white in an area in which the long second luminance values (X-axis) are large and the short second exposure pixels cause black sinking in an area in which the long second luminance values (X-axis) are small, the luminance level ratio representative values (Y-axis) in these areas have large errors from the values to the long second luminance values (X-axis) near to the center of them, and the produced graph becomes a curve having a gentle peak at an intermediate level of the long second luminance values (X-axis). The range of use of the long second luminance values (X-axis) to be used for calculating the correction gain G is determined around the long second luminance value (X-axis) corresponding to the peak position. The luminance level ratio representative values (Y-axis) corresponding to the long second luminance values (X-axis) situated in the set range are extracted, and the average value of the extracted luminance level ratio representative values (Y-axis) is calculated to determine the correction gain G.

However, the determination method of the correction gain disclosed in the aforesaid first patent document has a point requiring examination: the method must execute enormous calculations. In order to calculate the correction gain, the following mass operations are necessary: division operations for obtaining the luminance level ratios to all of the pixels, the sorting processing and the product-sum operations for totalizing the calculated luminance level ratios for every long second luminance value to obtain the average of them, and the like. If the calculation method is realized by software or hardware, a long time is needed for the calculation up to the correction gain determination. In particular, in the case of a camera for a moving image (monitoring camera) installing a wide dynamic range image synthesizing processing function, the correction gain determining method disclosed in the first patent document is required to end the calculation of the correction gain within $1/60$ seconds if the frame rate of the camera for a moving image is 60 fps. However, the hardware of the camera for a moving image has not been able to realize the completion of the calculation within $1/60$ seconds. Then, the calculation of the correction gain from image signals has not been performed, but the wide dynamic range image has been synthesized by using a coefficient determined beforehand. Consequently, fake edges caused by the errors of the correction gains have occurred in final wide dynamic range images.

Moreover, because the technique disclosed in the first patent document adopts the method of determining the correction gain on the basis of the calculation results of the luminance level ratios to all of the pixels, the number of pixels to be used for the calculation of the correction gain is uniquely determined. In order to improve the calculation accuracy of the correction gain and to synthesize a wide dynamic range image having an ultra-high image quality emphasizing a fake edge reducing effect, it is advantageous to have a large number of pixels to be used for the calculation as many as possible. However, in the application sufficient for a normal image quality, it is over specification to have the ultra-high image quality caused by improving the calculation accuracy of the correction gain.

Because the technique disclosed in the first patent document adopts the method of determining the correction gain on the basis of the calculation results of the luminance level ratios to all of the pixels, the method cannot set the number of the pixels to be used for the calculation to an arbitrary number. Consequently, it is impossible to flexibly set the correction gain calculation accuracy and the calculation speed according to each application.

It is an object of the present to provide an image processing apparatus and method, both capable of determining a correction gain factor to synthesize an image at a high rate of speed.

SUMMARY OF THE INVENTION

An image processing apparatus of the present invention is an image processing apparatus for synthesizing a long second exposure image derived by larger exposure quantity and a short second exposure image derived by smaller exposure quantity, for imaging of the same scene, comprising: a long second middle luminance image detecting unit for detecting a pixel position of a pixel having a pixel value in a first middle luminance pixel value region from the long second exposure image; a short second middle luminance image detecting unit for detecting a pixel position of a pixel having a pixel value in a second middle luminance pixel value region from the short second exposure image; a correction gain factor calculating unit for designating, as a common pixel, a pixel having a common pixel position such that the pixel position detected by the long second middle luminance image detecting unit is the same as the pixel position detected by the short second middle luminance image detecting unit, and for calculating a correction gain factor based on the pixel value of the long second exposure image and the pixel value of the short second exposure image at a pixel position of the common pixel position; and an image synthesizing unit for synthesizing for multiplying the short second exposure image by the correction gain factor, and for synthesizing the short second exposure image subjected to the multiplication and the long second exposure image.

Moreover, an image processing method of the present invention is an image processing method for synthesizing a long second exposure image derived by larger exposure quantity and a short second exposure image derived by smaller exposure quantity, for imaging of the same scene, comprising: a long second middle luminance image detecting step for detecting a pixel position of a pixel having a pixel value in a first middle luminance pixel value region from the long second exposure image; a short second middle luminance image detecting step for detecting a pixel position of a pixel having a pixel value in a second middle luminance pixel value region from the short second exposure image; a correction gain factor calculating step for designating, as a common pixel, a pixel having a common pixel position such that the pixel position detected by the long second middle luminance image detecting unit is the same as the pixel position detected by the short second middle luminance image detecting unit, and for calculating a correction gain factor based on the pixel value of the long second exposure image and the pixel value of the short second exposure image at a pixel position of the common pixel position; and an image synthesizing step for synthesizing for multiplying the short second exposure image by the correction gain factor, and for synthesizing the short second exposure image subjected to the multiplication and the long second exposure image.

Other features and advantages of the present invention will be apparent from the following description taken in conjunction with the accompanying drawings, in which like reference characters designate the same or similar parts throughout the figures thereof.

The accompanying drawings, which are incorporated in and constitute a part of the specification, illustrate embodiments of the invention and, together with the description, server to explain the principles of the invention.

DESCRIPTION OF THE EMBODIMENTS

Figure 1:
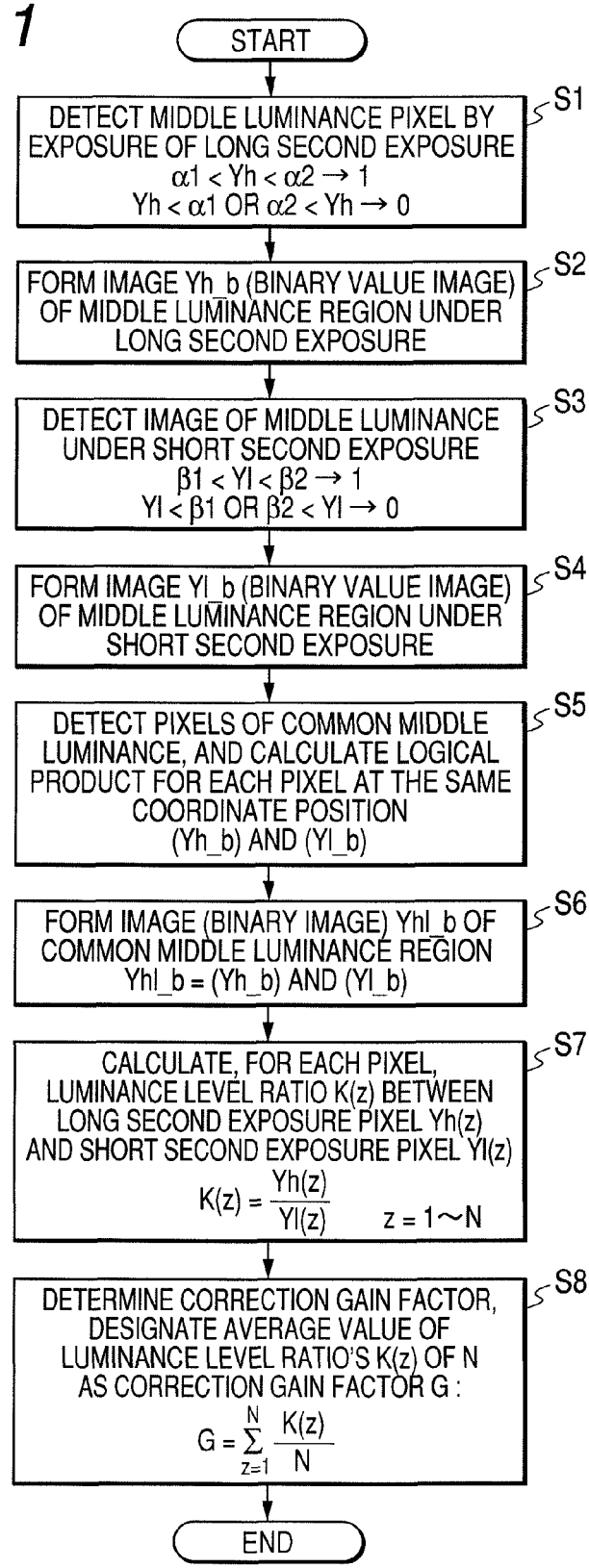
FIG. 1 is a flowchart illustrating the flow of the processing of an image processing method according to an exemplary embodiment of the present invention.
Figure 8:
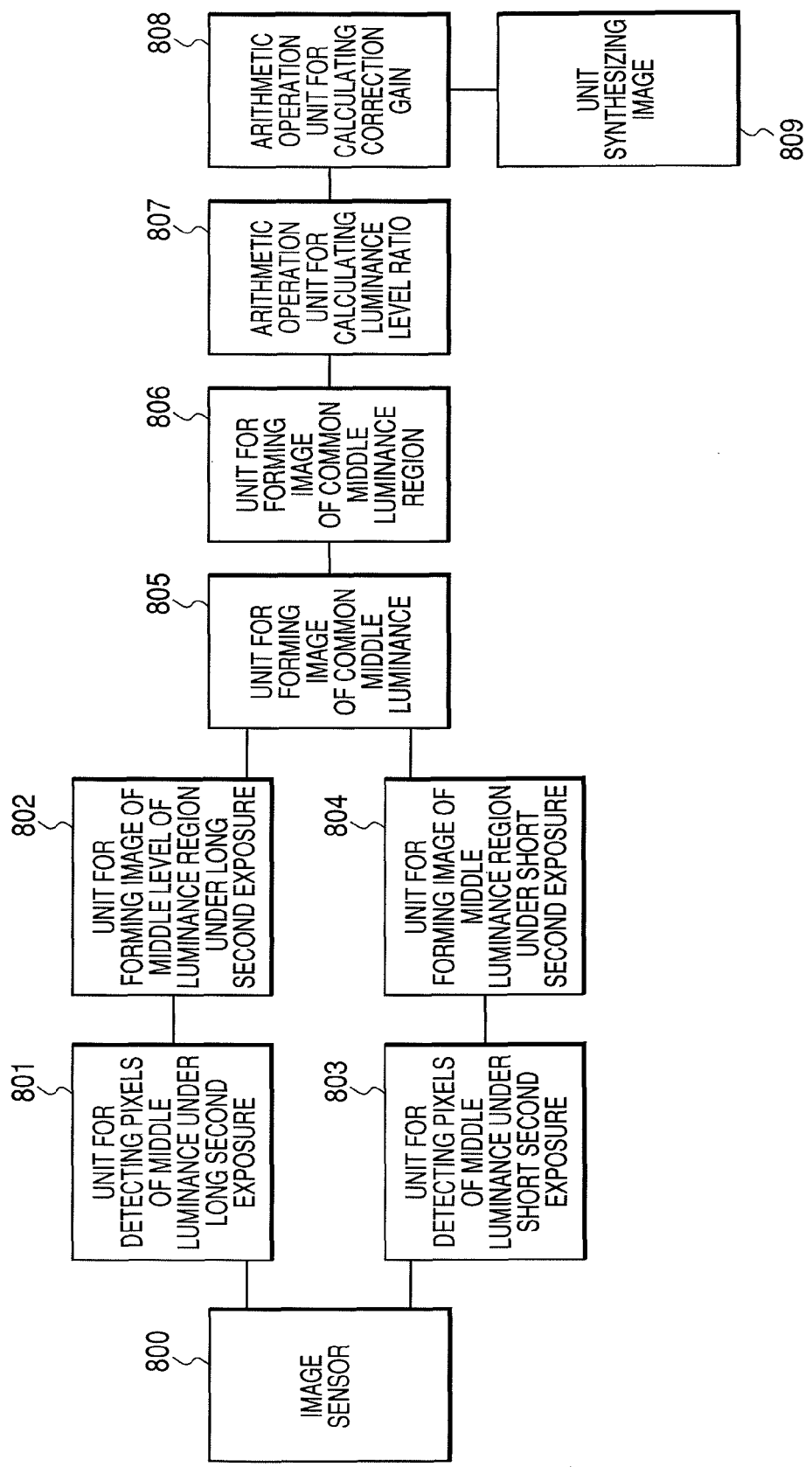
FIG. 8 is a diagram illustrating a configuration example of an image processing apparatus according to an exemplary embodiment of the present invention.

FIG. 8 is a diagram illustrating a configuration example of an image processing apparatus according to an exemplary embodiment of the present invention, and FIG. 1 is a flowchart illustrating the image processing method of the image processing apparatus. To put it concretely, FIG. 1 is a flowchart for describing the flow of the processing of calculating a gain factor to be used at the time of synthesizing a wide dynamic range image from the luminance information of the two images of a long second exposure image and a short second exposure image.

An image sensor 800 is a solid-state imaging device including two-dimensionally arranged photodiodes, and generates two images of a long second exposure image and a short second exposure image by photoelectric conversion. To put it concretely, the image sensor 800 photographs a plurality of images, having different exposure quantities from one another, of the same scene. A long second exposure image accumulated for a long exposure time is first imaged in order that the image signals of the lower luminance side of a subject may take suitable values. A short second exposure image accumulated for a short time is next imaged in order that the image signals on the higher luminance side of the subject may take suitable values.

At a step S1 of detecting middle luminance pixels by the exposure of the long second exposure, a unit 801 for detecting the pixels of the middle luminance under the long second exposure detects the pixels having middle luminance values, at which pixels no "saturation into white" and no "black sinking" occur, among all of the pixel output values in the long second exposure image. The pixels the output values of which are equal to or more than a threshold value α1 and equal to or less than a threshold value α2 among all of the output values Yh of the pixels constituting the long second exposure image are defined as the pixels of middle luminance under long second exposure, and a numeral 1 is assigned to the coordinates of the corresponding pixel positions. The pixels the output values of which are less than the threshold value α1 or larger than the threshold value α2 are determined to include the pixels at which the "saturation into white" and the "black sinking" occur, and the pixels are not defined as the pixels of middle luminance under long second exposure, but a numeral 0 is assigned to the coordinates of the corresponding pixel positions.

At a step S2 of forming an image of a middle luminance region under long second exposure, a unit 802 for forming an image of a middle level of luminance region under the long second exposure generates an image Yh_b of a middle luminance region under the long second exposure, which image is a binary image, in which the pixels of the middle luminance and the other pixels are separated on the basis of the coordinate positions of the pixels of the middle luminance under the long second exposure detected by the processing at the step S1. The unit 802 then assigns an active symbol to the pixels of the middle luminance. In the present exemplary embodiment, binarization processing is supposed to be performed by positive logic, and a symbol 1 is assigned to the pixels of middle luminance.

At a step S3 of detecting an image of the middle luminance under the short second exposure, a unit 803 for detecting the pixels of the middle luminance under the short second exposure detects the pixels that have the middle luminance values and have no occurrence of the "saturation into white" and "black sinking among the output values of all of the pixels of the short second exposure image. The unit 803 then defines the pixels having the output values equal to or more than β1 and equal to or less than β2 among the output values Y1 of all of the pixels constituting the short second exposure image as pixels of the middle luminance under the short second exposure, and assigns a numeral 1 to the coordinates at the corresponding pixel positions. The pixels having the output values less than β1 or larger than β2 are determined to include the pixels at which the "saturation into white" and the "black sinking" occur, and does not define the pixels as the pixels of the middle luminance under the short second exposure, but a numeral 0 is assigned to the coordinates of the corresponding pixel positions.

At a step S4 of forming an image of the middle luminance region under the short second exposure, a unit 804 for forming an image of the middle luminance region under the short second exposure generates an image Y1_b of the middle luminance region under the short second exposure, which is a binary image in which the pixels of the middle luminance are separated from the other pixels, on the basis of the coordinates positions of the pixels of the middle luminance under the short second exposure, which pixels have been detected at the step S3. The unit 804 then assigns a numeral 1 to the pixels of the middle luminance.

Although the procedure illustrated in FIG. 1 sequentially executes the processing at the steps S1 and S2 to specify the pixels of the middle luminance in the long second exposure image and sequentially executes the processing at the steps S3 and S4 to specify the pixels of the middle luminance in the short second exposure image, the procedure of the processing is not limited to this one. The processing at the steps S3 and S4 may be first sequentially executed before to specify the pixels of the middle luminance in the short second exposure image, and the procedure at the steps S1 and S2 may be second sequentially executed to specify the pixels of the middle luminance in the long second exposure image. Moreover, the processing at the steps S1 and S2 and the processing at the steps S3 and S4 may be simultaneously executed by parallel processing.

At a step S5 of detecting the pixels of common middle luminance, a unit 805 for forming an image of the common middle luminance performs a logical product (AND) operation to every pixel at the same coordinate positions in both the image Yh_b generated at the step S2 and the image Y1_b generated at the step S4. The numeral 1 is assigned to the pixels of the middle luminance in both the images Yh_b and Y1_b. Consequently, the pixels at which the results of the logical products of the respective pixels are 1 are the common pixels of the middle luminance, which have been detected as the pixels of the middle luminance in both the images Y1_b and Yh_b.

At a step S6 of forming an image of a common middle luminance region, a unit 806 for forming an image of the common middle luminance region generates an image Yh1_b of the common middle luminance region, which is a binary image in which the pixels of the common middle luminance and the other pixels are separated, on the basis of the coordinate positions of the pixels of the common middle luminance detected at the processing at the step S5. The unit 806 then assigns a numeral 1 to the pixels of the common middle luminance.

At a step S7 of calculating a luminance level ratio, an arithmetic operation unit 807 for calculating the luminance level ratio calculates a luminance level ratio K(z) from a ratio between the output value of a pixel of the long second exposure image Yh and the output value of a pixel in the short second exposure image Y1, both pixels situated at the coordinate position of a pixel of the common middle luminance detected at the step S6.

In the following, the procedure of the operation of the luminance level K(z) will be described. In order to detect the pixels of the common middle luminance, the arithmetic operation unit 807 scans the image Yh1_b in the horizontal direction from the upper part of the image in order. If a pixel value is 0, then the arithmetic operation unit 807 excludes the pixel from the objects of the calculation to neglect the pixel. If a pixel value is 1, then the arithmetic operation unit 807 assigns an address z=1 to the coordinate as an object pixel. The arithmetic operation unit 807 next continues to execute the scanning. If the pixel value is 0, then the arithmetic operation unit 807 neglects the pixel. If the arithmetic operation unit 807 detects 1, then the arithmetic operation unit 807 performs the increment of the address of the pixel, and assigns an address z=2 to the pixel as the address of the coordinate thereof. The arithmetic operation unit 807 performs the processing, to all of the pixels, of performing the increment of the address z of a pixel having the pixel value of 1 when the arithmetic operation unit 807 detects the pixel. If N pixels of the common middle luminance exist, then the addresses z of 1-N are assigned to the coordinate positions of the pixels of the common middle luminance. The arithmetic operation unit 807 next extracts the output value of a pixel situated at the coordinate position of the address z in the long second exposure image Yh(z) and the output value of a pixel situated at the coordinate position of the address z in the short second exposure image Y1(z), and calculates the ratio between the pixel output values to set the ratio as the luminance level ratio K(z). The arithmetic operation unit 807 performs the calculation to the pixels at the coordinates indicated by the addresses z=1-N, and thus calculates the luminance level ratios K(z) at the N pixels of the common middle luminance.

A formula (1) illustrates a calculation formula of the luminance level ratio K(z).

$$K(z) = \frac{Yh(z)}{Yl(z)} \quad (1)$$

Hereupon, a sign Yh(z) denotes the pixel value of the long second exposure image Yh at the address z. A sign Y1(z) denotes the pixel value of the short second exposure image Y1 at the address z. A sign K(z) denotes the luminance level ratio at the address z. The address z expresses the addresses 1-N. A sign N denotes the number of the pixels of the common middle luminance.

At a step of calculating of a correction gain factor, an arithmetic operation unit 808 for calculating the correction gain obtains an average value of the N luminance level ratios K(z), and calculates a correction gain factor G. A formula (2) illustrates a calculation formula of the correction gain factor G $$G = \sum_{z=1}^{N} \frac{K(z)}{N} \quad (2)$$

A method of a unit 809 for synthesizing an image to synthesize a wide dynamic image by using the correction gain factor G determined in accordance with the present exemplary embodiment will be described step by step.

Figure 2A:
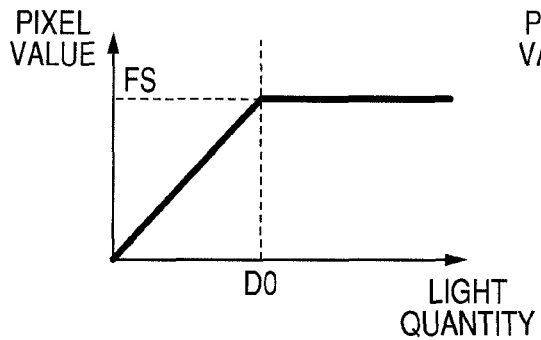
FIGS. 2A and 2B are diagrams illustrating the relation between the incident light quantity sensed by an image sensor and pixel output values at the times of long second exposure image imaging and short second exposure image imaging.

FIG. 2A is a graph illustrating the relation between an incident light quantity sensed by the image sensor 800 and the pixel output value thereof in a long second exposure image. As the incident light quantity increases, the pixel output value also increases. When the incident light quantity becomes D0 or more, the photodiodes of the image sensor 800 is saturated. Even if the incident light quantity further increases, the pixel output value is in the state of "saturation into white" to be constant. The gradation of the incident light that the photodiodes have actually received cannot be reproduced to the incident light quantity larger than D0, and consequently the dynamic range of the image signal is limited at the D0.

Figure 2B:
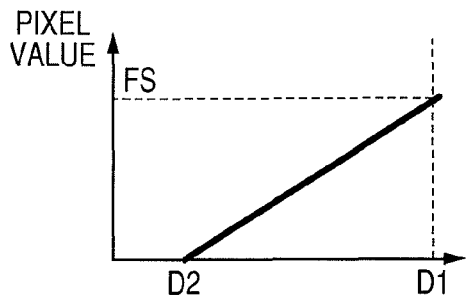

FIG. 2B is a graph illustrating the relation between the incident light quantity into the image sensor 800 and the pixel output value in a short second exposure image. Although the pixel output value is saturated at the incident light quantity of D0 in the long second exposure image as illustrated in the graph of FIG. 2A, because the exposure time of the short second exposure image is shorter than that of the long second exposure image, the pixel output value is not saturated at D0, and the pixel output value is linearly output up to the incident light quantity of D1 illustrated in FIG. 2B. However, the exposure quantity is insufficient to obtain the incident light quantity on the lower luminance side of the subject, and the pixel output value decreases by a large margin. The exposure time to obtain the incident light quantity of D2 or less is insufficient, and the photocharges accumulated in the photodiodes are at the noise level or less of the photodiodes. Consequently, the pixel output value cannot be recognized as an image signal. If the incident light is D2 or less, the gradation of the subject cannot be reproduced, and the pixel output value is in the "black sinking" state. The dynamic range of the image signal is limited here.

Figure 3A:
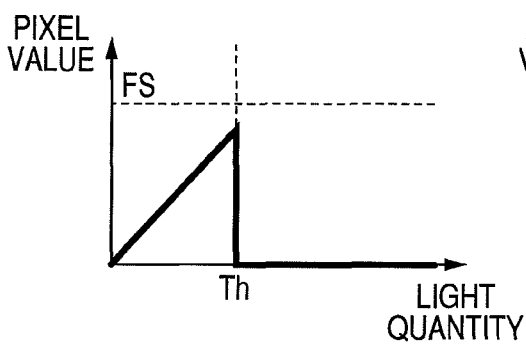
FIGS. 3A and 3B are diagrams illustrating the relation between incident light quantities and pixel output values in a long second exposure image and a short second exposure image when the pixel values at a threshold value Th or more are replaced with zeros.

In FIG. 2A, it is judged that the pixel output value of the incident light quantity near to the D0 produces the "saturation into white," and the pixel output value of a threshold value Th or more is replaced with zero. FIG. 3A is a graph illustrating the relation between the incident light quantity and the pixel output value of the long second exposure image when the pixel output value of the threshold value Th or more of FIG. 2A is replaced with zero. The pixel output value less than the threshold value Th is in an unsaturated state, and is a signal having no "saturation into white." Moreover, the pixel output value has sufficient magnitudes on the lower luminance side, and is a signal having no "black sinking." Next, in order to replace the pixel output value of the threshold value Th or more, which pixel output value is set as zero, in the long second exposure image Yh with the pixel output value of the short second exposure image Y1, the pixel output value of the threshold value Th or less of the short second exposure image Y1.

Figure 3B:
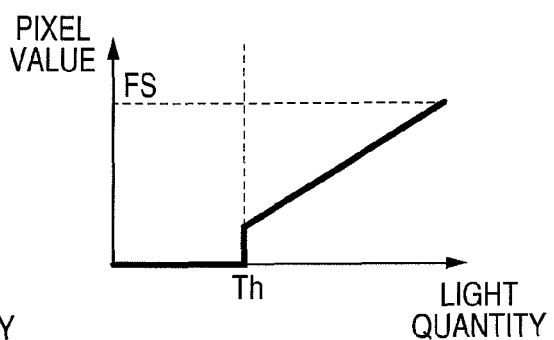

FIG. 3B is a graph illustrating the relation between the incident light quantity and the pixel output value of the short second exposure image in which the pixel output value of the threshold value Th or less in FIG. 2B is replaced with zero. A pixel output value having no saturation to the incident light quantity from the threshold value Th up to D1 can be obtained. The unit 809 next adds the two images of the long second exposure image of FIG. 3A, in which the pixel output value of the threshold value Th or more is changed to zero, and the short second exposure image of FIG. 3B, in which the pixel output value of the threshold value Th or less is changed to zero, with each other.

Figure 4:
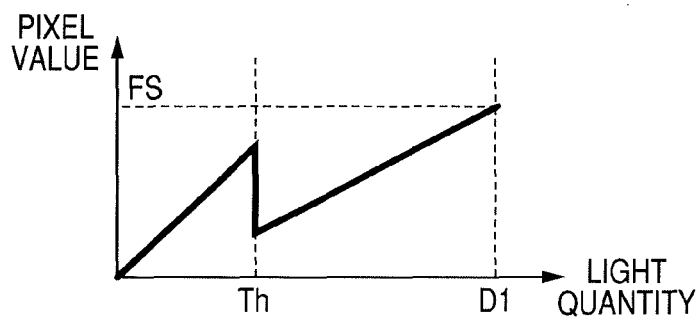
FIG. 4 is a diagram illustrating the relation between incident light quantities and pixel output values of an image synthesized by addition processing.

A graph illustrating the relation of the incident light quantity and the pixel output value of the image synthesized by the addition processing is FIG. 4. The curve corresponding to the incident light quantity, which is less than the threshold value Th, indicates the pixel output value of the long second exposure image, and the curve corresponding to the incident light quantity, which is the threshold value Th or more, indicates the pixel output value of the short second exposure image. A discontinuous point is produced in the increasing curve of the pixel output value to the increasing incident light quantity at a part of the pixel output value of the threshold value Th, and a large step is produced. The step is produced by the gain difference caused by the difference of the exposure times of both of the images. In order to make the curve of the increasing pixel output value continuous near the threshold value Th, and to synthesize an image having an expanded dynamic range, the pixel output value of the threshold value Th or more (the pixel output value of the short second exposure image) is multiplied by the correction gain factor G calculated by the method of the present exemplary embodiment.

Figure 5:
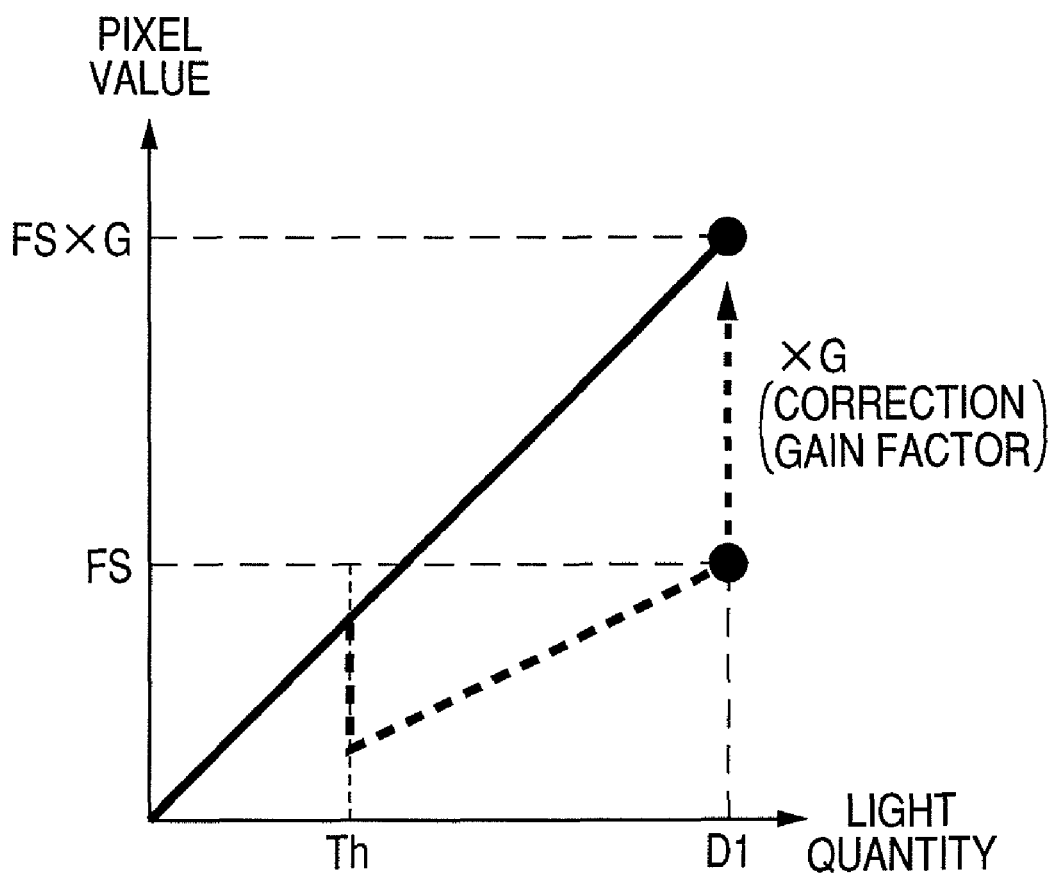
FIG. 5 is a diagram illustrating the relation between incident light quantities and pixel output values of a synthesized image at the time of performing the multiplication of a correction gain factor G.

FIG. 5 is a graph illustrating the relation between the incident light quantity and the pixel output value of the synthesized image produced by the multiplication of the correction gain factor G to the pixel output value corresponding to the incident light quantity of the threshold value Th or more (the pixel output value of the short second exposure image). The pixel output value increasing curve has no discontinuity and no step at the threshold value Th. Moreover, the multiplication of the correction gain factor G by the pixel output value corresponding to the incident light quantity of the threshold value Th or more (the pixel output value of the short second exposure image) expands the dynamic range. The pixel output value corresponding to the incident light quantity D1 has been Fs before the multiplication of the correction gain factor G, but the pixel output value is FS×G after the multiplication of the correction gain factor G. Thus, the image having the dynamic range expanded by G times can be synthesized. The correction gain factor G is calculated by the method of the present exemplary embodiment, and the pixel output value increasing curve has no discontinuity. The high image quality wide dynamic range image having no fake edge can be thus synthesized.

The determination method of the threshold values α1, α2, β1, and β2 to determine the pixels of the middle luminance under the long second exposure and the pixels of the middle luminance under the short second exposure, which threshold values are necessary for calculating the correction gain factor G in the present exemplary embodiment, will be next described.

Figure 6:
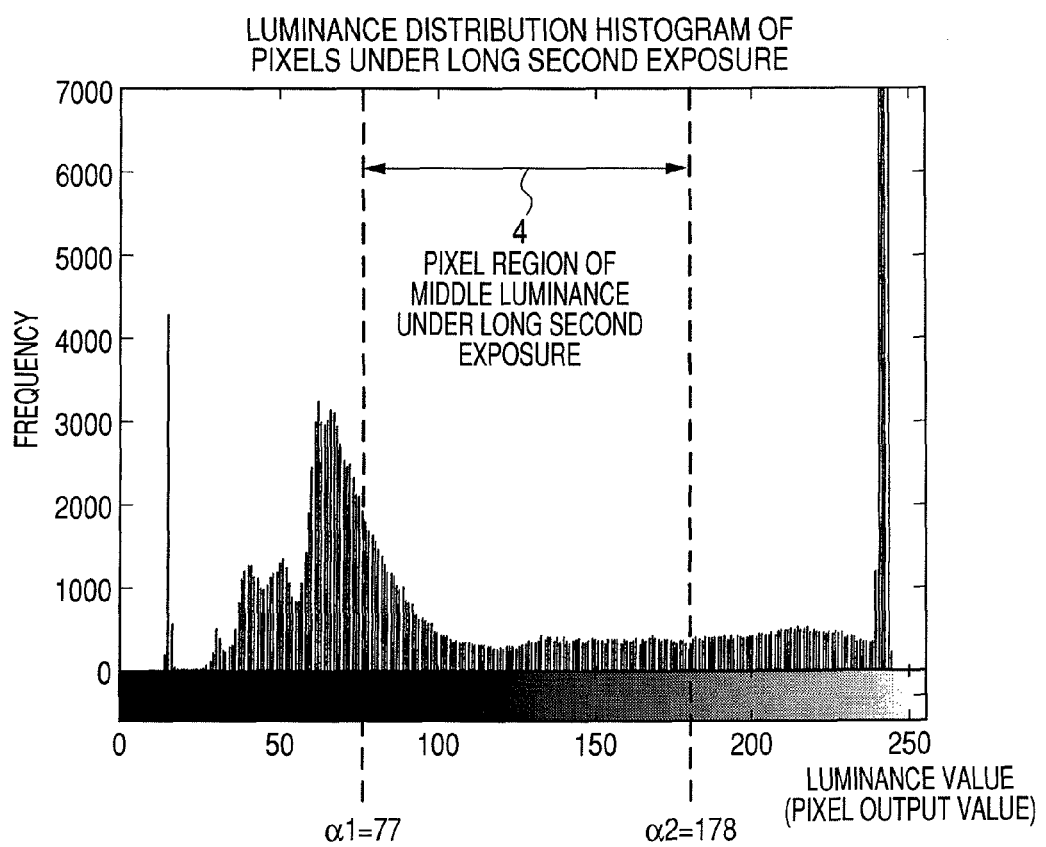
FIG. 6 is a diagram of a luminance histogram illustrating a distribution of the pixel output values of a long second exposure image.

The set values of the threshold values α1 and α2 to determine the pixels of the middle luminance under the long second exposure will be described with reference to FIG. 6. FIG. 6 is a luminance histogram illustrating the distribution of the pixel output value of the long second exposure image Yh. The image used in FIG. 6 is an image of 8 bits and 256 steps of gradation, and the saturation into white occurs therein because the exposure time thereof is long. The image has the luminance distribution in which the frequency of the pixel output value of 240 or more is very large. If the maximum value 255 of the pixel output is supposed to 100%, and if the pixels of the middle luminance under the long second exposure is defined as the ones within a range from 30% to 70%, both inclusive, of the maximum value of the pixel output, then α1 becomes 77, and α2 becomes 178, and the region 4 in FIG. 6 is the pixel region of the middle luminance under the long second exposure. In order to calculate the correction gain factor G with good accuracy at a high rate of speed, the sample number of the pixels of the middle luminance under the long second exposure is needed to be a predetermined number or more, and the pixel region 4 of the middle luminance under the long second exposure is the most suitable range in which both of the high speed property and the enhancement of accuracy are satisfied.

Incidentally, the present exemplary embodiment defines the pixels of middle luminance under long second exposure as the ones within the range from 30% to 70%, both inclusive, of the maximum value of the pixel output, but the range is not limited to this one. As the lower limit value of the threshold value α1, it is desirable to set the lower limit value to the 10% of the maximum value of the pixel output. The reason is that, if the threshold value α1 is set to be 10% or less of the maximum value of the pixel output, then black sinking pixels and pixels including noises to make their SN ratios worse are defined as the pixels of the middle luminance under the long second exposure, and errors would arise in the calculation result of the correction gain factor G. As the upper limit value of the threshold value α2, the upper limit value is desirably set to the 80% of the maximum value of the pixel output. The reason is that the pixels at which the saturation into white occurs are defined as the pixels of the middle luminance under the long second exposure, and the errors would arise in the calculation result of the correction gain factor G.

Figure 7:
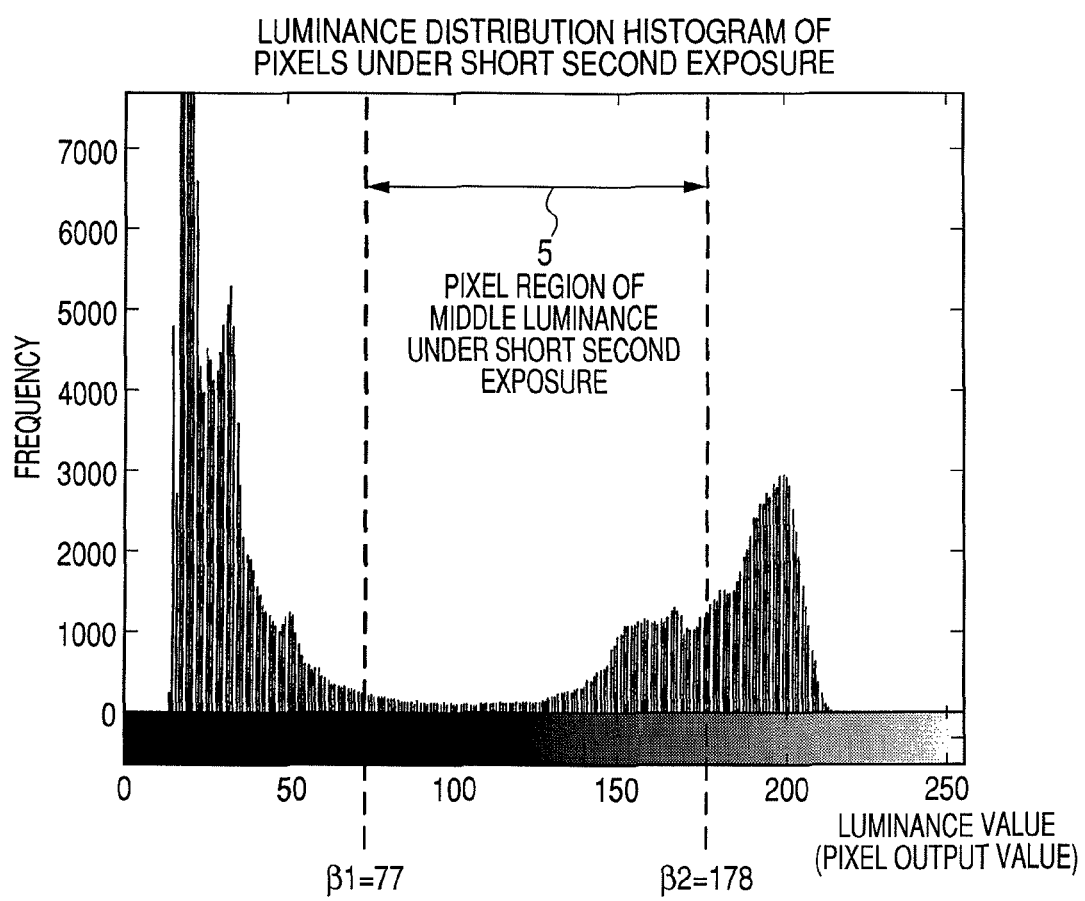
FIG. 7 is a diagram of a luminance histogram illustrating a distribution of the pixel output values of a short second exposure image.

Next, the set values of the threshold values β1 and β2 to determine the pixels of the middle luminance under the short second exposure will be described with reference to FIG. 7. FIG. 7 is a luminance histogram illustrating the distribution of the pixel output value of the short second exposure image Y1. The image used in FIG. 7 is an image of 8 bits and 256 steps of gradation, and the black sinking occurs therein because the exposure time thereof is short. The image has the luminance distribution in which the frequency of the pixel output value near to 0 is very large. Moreover, because the pixel output values on the higher luminance side (about 200 or more) does not have any tendency of the rapid increase of the frequency, it is known that the saturation into white does not occur. If the maximum value 255 of the pixel output is supposed to 100%, and if the pixels of the middle luminance under the short second exposure is defined as the ones within a range from 30% to 70%, both inclusive, of the maximum value of the pixel output, then β1 becomes 77, and β2 becomes 178, and the region 5 in FIG. 7 is the pixel region of the middle luminance under the short second exposure. In order to calculate the correction gain factor G with good accuracy at a high rate of speed, the sample number of the pixels of the middle luminance under the short second exposure is needed to be a predetermined number or more, and the pixel region 5 of the middle luminance under the short second exposure is the most suitable range in which both of the high speed property and the enhancement of accuracy are satisfied.

Incidentally, the present exemplary embodiment defines the pixels of middle luminance under short second exposure as the ones within the range from 30% to 70%, both inclusive, of the maximum value of the pixel output, but the range is not limited to this one. As the lower limit value of the threshold value β1, it is desirable to set the lower limit value to the 20% of the maximum value of the pixel output. The reason is that, if the threshold value β1 is set to be 20% or less of the maximum value of the pixel output, then black sinking pixels and pixels including noise to make their SN ratios worse are defined as the pixels of the middle luminance under the short second exposure, and errors would arise in the calculation result of the correction gain factor G. In particular, because the exposure time of the short second exposure image is shorter than that of the long second exposure image, the frequency of the occurrence of the black sinking pixels increases. Accordingly, the 10% (=α1) of the maximum value of the pixel output of the long second exposure image and the 20% (=β1) of the maximum value of the pixel output of the short second exposure image are set as the lower limit values of the threshold values to determine the pixel region of the middle luminance.

As the upper limit value of the threshold value β2, the upper limit value is desirably set to the 90% of the maximum value of the pixel output. The reason is that the pixels at which the saturation into white occurs are defined as the pixels of the middle luminance under the short second exposure, and the errors would arise in the calculation result of the correction gain factor G. Because the exposure time of the short second exposure image is shorter than that of the long second exposure image, the frequency of the occurrence of the saturation into white decreases. Accordingly, the 80% (=α2) of the maximum value of the pixel output of the long second exposure image and the 90% (=β2) of the maximum value of the pixel output of the short second exposure image are set as the lower limit values of the threshold values to determine the pixel region of the middle luminance.

Moreover, the combination of the threshold values α1, α2, β1, and β2 enables the changing of the sizes of the pixel regions 4 and 5, and enables the change of the sample number of the pixels of the common middle luminance to be used at the time of calculating the correction gain factor G. By reducing the threshold values α1 and β1, and by enlarging the threshold values α2 and β2, the ranges of the pixel regions 4 and 5 are expanded, and the sample numbers of the common pixels of the middle luminance and the luminance level ratios K increase. As a result, the correction gain factor G is led to be obtained from the luminance level ratios K, the sample number of which has increased, and the errors caused by the noise components and the like are decreased to make the accuracy of the correction gain factor G be improved.

Because the method improves the accuracy, although the method increases the calculation time up to the calculation of the correction gain factor G, the method is used at the time of synthesizing an ultra-high image quality wide dynamic range image having a large fake edge reducing effect. The method can be used for the application of an ultra-high image quality still image camera and the like, which can spare a certain time for the calculation of the gain factor G. By enlarging the threshold values $\alpha 1$ and $\beta 1$, and by reducing the threshold values $\alpha 2$ and $\beta 2$, the ranges of the pixel regions 4 and 5 are reduced, and the sample numbers of the common pixels of the middle luminance and the luminance level ratios K decrease. As a result, the correction gain factor G is led to be obtained from the luminance level ratios K, the sample number of which has decreased, and the calculation time up to the calculation of the correction gain factor G is shortened by a large margin.

Because the method can shorten the calculation time by a large margin with the calculation accuracy of the correction gain factor G secured at a certain degree, the method is used at the time of synthesizing a wide dynamic range image requiring high speed processing. The method can be used for the application of a high speed imaging moving image camera and the like, which must complete the calculation of the correction gain factor G within a predetermined time.

By the execution of the operation procedure described above, the operation quantity can be reduced by a large margin by calculating the correction gain G by detecting the pixels having the middle luminance values in both of the long second exposure image and the short second exposure image at a high rate of speed to used only the detected pixels.

As described above, the image processing apparatus according to the present exemplary embodiment detects the pixels of the common middle luminance having the middle luminance values in both of the long second exposure image and the short second exposure image by logical product operations on the basis of the positional information of the pixels of the middle luminance of the long second exposure image and the positional information of the pixels of the middle luminance of the short second exposure image, both pieces of the positional information detected by the threshold value processing. The correction gain G at the time of image synthesis is then determined on the basis of the ratios of the luminance values of the detected pixels of the common middle luminance.

According to the present exemplary embodiment, after extracting the pixels to determine the correction gain G by the threshold value operation and the logical product operation, the correction gain G is determined by the luminance level ratios of the long second exposure pixels and the short second exposure pixels by using only the extracted pixels. Consequently, the enormous calculations that are required for the technique disclosed in the first patent document are not required, and the correction gain G can be determined at a high rate of speed. Thereby, a high speed wide dynamic range image synthesizing processing can be realized.

Moreover, by changing the threshold value levels of the threshold value processing to extract the pixels for correction gain determination, the total number of the pixels for the correction gain determination can be changed. As a result, the control of the relation between the operation speed of the correction gain and the operation accuracy thereof is enabled, and flexible wide dynamic range image synthesizing processing capable of dealing with both of the moving image application requiring high speed processing and the still image application requiring ultra-high image quality processing can be realized. That is, the numbers of the pixels included in the first and second middle luminance pixel value regions are converted by a moving image mode and a still image mode, such that the number of the pixels in the moving image mode is larger than that in the still image mode.

The image sensor 800 in the image processing apparatus and the image processing method of the present exemplary embodiment images the long second exposure image having the large exposure quantity and the short second exposure image having the small exposure quantity of the same scene (subject). The unit 801 for detecting the pixels of the middle luminance under the long second exposure detects the pixel positions of the pixels having the pixel values in the first middle luminance pixel value region 4 from the long second exposure image at the step S1 of detecting the middle luminance pixel by exposure of the long second exposure. The unit 803 for detecting the pixels of the middle luminance under the short second exposure detects the pixel positions of the pixels having the pixel values in the second middle luminance pixel value region 5 from the short second exposure image at the step S3 of detecting the image of the middle luminance under the short second exposure. The unit 805 for forming the image of the common middle luminance detects the pixels as the common pixels, which pixels situated at the common pixel positions to the pixel positions detected by the unit 801 and the pixel positions detected by the unit 803, at the step S5 of detecting the pixels of the common middle luminance. The arithmetic operation unit 808 for calculating the correction gain calculates the correction gain factor G on the basis of the pixel values of the long second exposure image and the pixel values of the short second exposure image at the pixel positions of the common pixels at the step S8 of calculating of the correction gain factor. The unit 809 for synthesizing an image multiplies the short second exposure image by the correction gain factor G to synthesize the multiplied short second exposure image with the long second exposure image at the image synthesizing step.

The arithmetic operation unit 807 for calculating the luminance level ratio and the arithmetic operation unit 808 for calculating the correction gain calculate the average value of the ratios K(z) between the pixel values of the long second exposure image and the pixel values of the short second exposure image at the pixel positions of the common pixels by the formulae (1) and (2) as the correction gain factor G.

The first middle luminance pixel value region can be the region of the pixel values within the range from 30% to 70%, both inclusive, of the maximum luminance pixel value, and the second middle luminance pixel value region can be the region of the pixel values within the range from 30% to 70%, both inclusive, of the maximum luminance pixel value.

Moreover, the first middle luminance pixel value region can be the region of the pixel values within the range from 10% to 80%, both inclusive, of the maximum luminance pixel value, and the second middle luminance pixel value region can be the region of the pixel values within the range from 20% to 90%, both inclusive, of the maximum luminance pixel value.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-106121, filed Apr. 13, 2007, which is hereby incorporated by reference herein in its entirety.

What is claimed is:

1. An image processing apparatus for synthesizing a long second exposure image derived by a long exposure time and a short second exposure image derived by a short exposure time, shorter than the long exposure time, for imaging of the same scene, the apparatus comprising:

a long second middle luminance pixel selecting unit configured to select out a pixel having a pixel luminance value in a first middle luminance region from pixels included in the long second exposure image, based on comparing the pixel luminance value of the pixel in the long second exposure image with a first lower threshold value and with a first upper threshold value;

a short second middle luminance pixel selecting unit configured to select out a pixel having a pixel luminance value in a second middle luminance region from pixels included in the short second exposure image, based on comparing the pixel luminance value of the pixel in the short second exposure image with a second lower threshold value and with a second upper threshold value;

a correction gain factor calculating unit configured to designate, as a common pixel, the pixel selected by the long second middle luminance pixel selecting unit and the pixel selected by the short second middle luminance pixel selecting unit, each of the pixels being at a common position, and to calculate a correction gain factor based on the pixel luminance values of both of the pixels; and an image synthesizing unit configured to multiply a value of data representing the short second exposure image by the correction gain factor, and to synthesize the short second exposure image, the value of the data of which is subjected to the multiplication, and the long second exposure image.

2. The apparatus according to claim 1, wherein the correction gain factor calculating unit calculates, as the correction gain factor, an average value of the ratio between the pixel luminance value of the long second exposure image and the pixel luminance value of the short second exposure image at the pixel position of the common pixel.

3. The apparatus according to claim 1, wherein the first middle luminance region is within a range of 30 to 70% of a maximum luminance pixel value, and wherein the second middle luminance region is within a range of 30 to 70% of a maximum luminance pixel value.

4. The apparatus according to claim 1, wherein the first middle luminance region is within a range of 10 to 80% of a maximum luminance pixel value, and wherein the second middle luminance region is within a range of 20 to 90% of a maximum luminance pixel value.

5. An image processing method for synthesizing a long second exposure image derived by a long exposure time and a short second exposure image derived by a short exposure time, shorter than the long exposure time, for imaging of the same scene, the apparatus comprising:

a long second middle luminance pixel selecting step for selecting out a pixel having a pixel value in a first middle luminance region from pixels included in the long second exposure image, based on comparing the pixel luminance value of the pixel in the long second exposure image with a first lower threshold value and with a first upper threshold value;

a short second middle luminance pixel selecting step for selecting out a pixel having a pixel luminance value in a second middle luminance pixel value region from pixels included in the short second exposure image, based on comparing the pixel luminance value of the pixel in the short second exposure image with a second lower threshold value and with a second upper threshold value;

a correction gain factor calculating step for designating, as a common pixel, the pixel selected by the long second middle luminance pixel selecting step and the pixel selected by the short second middle luminance pixel selecting step, each of the pixels being at a common position, and for calculating a correction gain factor based on the pixel luminance values of both of the pixels; and an image synthesizing step for multiplying a value of data representing the short second exposure image by the correction gain factor, and for synthesizing the short second exposure image, the value of the data of which is subjected to the multiplication, and the long second exposure image.

6. An image processing apparatus for synthesizing a long second exposure image derived by a long exposure time and a short second exposure image derived by a short exposure time, shorter than the long exposure time, for imaging of the same scene, the apparatus comprising:

a long second middle luminance image detecting unit configured to detect a pixel having a pixel value in a first middle luminance pixel value region from the long second exposure image;

a short second middle luminance image detecting unit configured to detect a pixel having a pixel value in a second middle luminance pixel value region from the short second exposure image;

a correction gain factor calculating unit configured to designate, as a common pixel, the pixel detected by the long second middle luminance image detecting unit and the pixel detected by the short second middle luminance image detecting unit, and to calculate a correction gain factor based on the pixel value of the long second exposure image and the pixel value of the short second exposure image at a pixel position of the common pixel; and an image synthesizing unit configured to multiply a value of data representing the short second exposure image by the correction gain factor, and to synthesize the short second exposure image, the value of the data of which is subjected to the multiplication, and the long second exposure image, wherein the numbers of the pixels included in the first and second middle luminance pixel value regions are converted by the apparatus operating in a moving image mode and a still image mode, such that the number of the pixels in the moving image mode is larger than that in the still image mode.

7. An image processing apparatus for synthesizing a long second exposure image derived by a long exposure time and a short second exposure image derived by a short exposure time, shorter than the long exposure time, for imaging of the same scene, the apparatus comprising:

a long second middle luminance pixel selecting unit configured to select out a pixel having a pixel luminance value in a first middle luminance region from pixels included in the long second exposure image;

a short second middle luminance pixel selecting unit configured to select out a pixel having a pixel luminance value in a second middle luminance region from pixels included in the short second exposure image;

a correction gain factor calculating unit configured to designate, as a common pixel, a pixel selected by the long second middle luminance pixel selecting unit and the pixel selected by the short second middle luminance pixel selecting unit, and to calculate a correction gain factor based on the pixel luminance value of the long second exposure image and the pixel luminance value of the short second exposure image at a pixel position of the common pixel; and an image synthesizing unit configured to multiply a value of data representing the short second exposure image by the correction gain factor, and to synthesize the short second exposure image, the value of the data of which is subjected to the multiplication, and the long second exposure image, wherein the numbers of the pixels included in the first and second middle luminance pixel value regions are converted by the apparatus operating in a first mode and a second mode, such that the number of the pixels in the first mode is different from that in the second mode.

8. The apparatus according to claim 7, wherein the first mode is a still image mode, and the second mode is a moving image mode, and the number of the pixels included in the first and second middle luminance pixel value regions in the first mode is larger than that in the second mode.

9. The apparatus according to claim 7, wherein the first mode is a moving image mode, and the second mode is a still image mode, and the number of the pixels included in the first and second middle luminance pixel value regions in the first mode is larger than that in the second mode.

10. An image processing apparatus for synthesizing a long-exposure image and a short-exposure image into an image having a wider dynamic range than each of the long-exposure image and the short-exposure image, the long-exposure image being derived by a longer exposure time than the short-exposure image, the apparatus comprising:

a first selecting unit configured to select a pixel having a luminance value within a first middle luminance range from pixels included in the long-exposure image, based on comparing luminance values of the pixels included in the long-exposure image with a first lower threshold value and with a first upper threshold value;

a second selecting unit configured to select a pixel having a luminance value within a second middle luminance range from pixels included in the short-exposure image, based on comparing luminance values of the pixels included in the short-exposure image with a second lower threshold value and with a second upper threshold value;

a calculating unit configured to calculate a gain factor based on the luminance value of the pixel selected by the first selecting unit and the luminance value of the pixel selected by the second selecting unit; and a synthesizing unit configured to synthesize the long-exposure image and the short-exposure image based on the gain factor calculated by the calculating unit, wherein the calculating unit omits at least one pixel included in the long-exposure image or the short-exposure image from the calculation of the gain factor.

11. The apparatus according to claim 10, wherein the calculating unit uses only the pixel selected by the first selecting unit or by the second selecting unit.

12. The apparatus according to claim 10, wherein the calculating unit omits a pixel which is not selected by the first selecting unit.

13. The apparatus according to claim 10, wherein the calculating unit omits a pixel which is not selected by the second selecting unit.

* * * * *